July 3, 1923.
R. L. DEWAR
ENGINE PISTON
Filed July 1, 1921
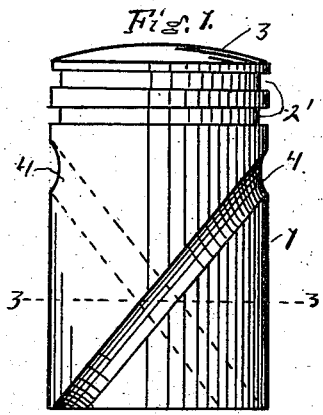
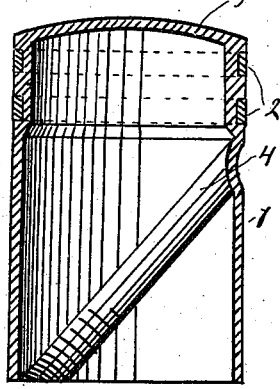
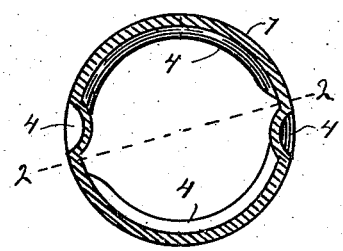
Inventor
Robert L. Dewar,
By Patented July 3, 1923.

1,460,537

UNITED STATES PATENT OFFICE.

ROBERT L. DEWAR, OF GRAND RAPIDS, MICHIGAN.

ENGINE PISTON.

Application filed July 1, 1921. Serial No. 481,866.

*To all whom it may concern:*

Be it known that I, ROBERT L. DEWAR, a citizen of the United States, residing at Grand Rapids, in the county of Kent and State of Michigan, have invented certain new and useful Improvements in Engine Pistons, of which the following is a specification.

My invention relates to improvements in pistons for use in internal combustion engines, and more particularly to improvements in aluminum, and other soft, light metal pistons, and its objects are: First, to avert the danger of the piston expanding to a sufficient extent to become immovable in the engine cylinder, and, second, to provide a means whereby the piston may be more thoroughly lubricated when operating within the cylinder.

I attain these objects by the mechanism, construction and arrangement of parts shown in the accompanying drawing, in which Fig. 1 is an elevation of a piston with the piston rings removed. Fig. 2 is a sectional elevation of the same practically upon the line 2—2 of Fig. 3, and, Fig. 3 is a transverse section of the piston looking upwardly from the line 3—3 on Fig. 1.

Similar reference numerals indicate similar parts throughout the several views.

It is a well known fact that in the use of aluminum in the construction of internal combustion engines, and especially in the construction of the piston, the extreme heat generated within the cylinder by the exploding vapor, or gas, as the case may be, causes the piston to expand to so great an extent that it, very frequently, so far exceeds the expansion of the cylinder as to become, temporarily, so firmly set in place as to render it impossible to get proper efficiency from the engine, and sometimes to become fast in place and liable either to stop the operation of the engine entirely, or to endanger the scratching, marring and distorting the cylinder or the piston to such an extent as to render the engine useless. Furthermore, it is a well known fact that in many instances it is impossible to so distribute the oil from the crank pits as to properly lubricate the pistons as they are reciprocating, very rapidly, in the cylinder.

To overcome these difficulties I have formed two or more large grooves, as indicated at 4, diagonally, or, rather, spirally around the piston from a point just below the lower piston ring to the lower end of the piston, 1. For some reason, which I am not, at this time, prepared to explain, this groove, or these grooves seem to lessen the expansive inclination of the heated piston sufficiently to absolutely avert the danger of the piston becoming "set" in the cylinder when acting under the influence of the rapidly exploding and burning vapor or gas.

It will be readily understood that, especially when the so called "splash system" of oiling is used, the rapidly splashing oil from the cylinder pit will be forced the entire length of these grooves, thus insuring the complete and liberal oiling of the entire surfaces of the cylinder and the piston, practically the entire length of the piston, thus causing the piston to remain much cooler, and to expand much less than would be the case if the oil was not made to circulate so freely along and over the sides of the piston and cylinder.

In the construction of this piston I greatly prefer that the heads of the pistons be made concavo-convex, with the convex surface upward, as it seems to have a much better effect upon the action of the piston within the cylinder, this form being illustrated at 3 in Figs. 1 and 2.

2' indicates the grooves around the piston into which the piston rings are mounted, as at 2, in the usual manner.

In Fig. 2 I have shown the position of the groove 4 as opposite from that shown in Fig. 1, to indicate that it is immaterial what the position or direction of the groove may be, whether upon a right hand spiral, or upon left hand spiral, the effect being the same in either instance.

The peculiar construction of my piston, narrow channels, 4, being formed in the outer surface of the wall by making concavo-convex internally inclined offsets in the wall, renders the piston sufficiently pliable along the lines of these offsets to avert the danger of over expansion of the piston when subjected to intense heat. I have found, by actual test, that with a hand clamp made for the purpose, I have been able to compress the open end of the piston .005 of an inch without great exertion. A second advantage gained with my construction lies in the fact that my deep, wide, oil grooves, 4, provides for so full a flow of oil through them as to force sufficient air into the grooves so the compression in the ends of the grooves will force the oil out of them with the upstroke of the piston. The last named advantages are brought about by reason of the slight spirality, or, rather, the relatively vertical position of said grooves, as they pass, not to exceed, one half way around the piston, and the cushioning of the air in the grooves averts the danger of the oil being forced beyond the piston rings and into the explosion chamber and forming carbon upon the end of the piston and in the cylinder.

Having thus fully described my invention, what I claim as new in the art, is:

In an engine piston having an annular body with ring grooves formed in it near the upper end, and an annular wall extending downwardly therefrom, inwardly inclined concavo-convex offsets formed from a line below the ring grooves and extending partly around the wall of the piston to its open end forming concave grooves in the outer surface of the piston and rendering this end of the piston slightly compressible, and producing air compression for properly distributing the oil around the piston.

Signed at Grand Rapids, Michigan, June 25, 1921.

ROBERT L. DEWAR.